United States Patent Office 3,218,546
Patented Nov. 16, 1965

3,218,546
A.C. AMPLITUDE CONTROL EMPLOYING A CAPACITOR DISCHARGED BY A VARIABLE CONDUCTANCE ELEMENT IN RESPONSE TO AN OUTPUT CONDITION
Donald N. James, Pacoima, and Paul B. Spranger, Sherman Oaks, Calif., assignors to The Bendix Corporation, North Hollywood, Calif., a corporation of Delaware
Filed Dec. 29, 1961, Ser. No. 163,350
1 Claim. (Cl. 323—93)

This invention relates to apparatus for varying or controlling the potential of an alternating current in accordance with a control potential. Such apparatus is useful in many alternating current systems, some examples of which are: voltage regulators; variable voltage sources; and modulators.

A general object of the invention is to provide a simple and practicable apparatus for varying the potential of alternating current.

A more specific object is to provide such an apparatus without moving parts and having electronic control.

Another specific object is to vary the potential of an alternating current by varying the impedance of a direct current element. This is advantageous in many instances because it is easier and more practicable to electronically vary the conductance of a D.C. circuit than of an A.C. circuit.

Other more specific objects and features of the invention will appear from the description to follow.

Essentially, the present invention resides in the insertion, between an A.C. source and an A.C. load, of rectifying means and a capacitor in such a way that successive half waves of the alternating current from the source are separately rectified to pulses of direct current, which are applied to the load in opposite sense and, in series, to the capacitor in a common sense to cumulatively charge it, with a variable conductance element in shunt to the capacitor. The alternating output current is therefore a function of the conductance of the variable conductance element which, since it handles only direct current, can be an electronic device (such as a transistor or vacuum tube) controlled by a relatively small control signal. If the variable conductance is extremely low, the capacitor charges up to the peak potential of the A.C. supply, no further rectification occurs, and the output A.C. current is zero. As the conductance is increased, the direct current therethrough and the alternating load current increase. The total alternating source voltage is divided between the D.C. voltage drop across the variable conductance and the alternating voltage across the load.

A full understanding of the invention may be had from the following description in connection with the drawing.

Figure 1:
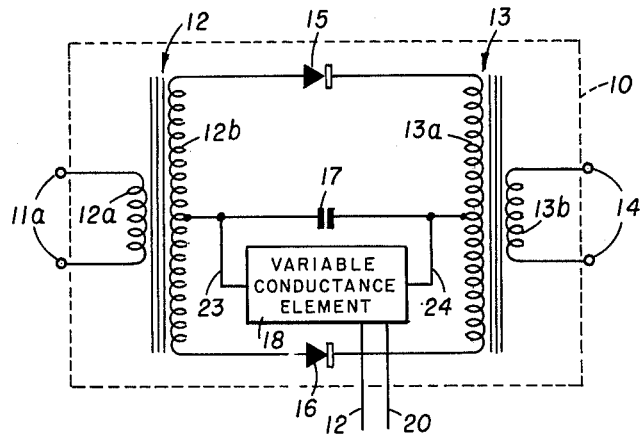
FIG. 1 is a schematic circuit diagram of one embodiment of the invention.

Referring to FIG. 1, an apparatus 10 in accordance with the invention is shown as comprising input terminals 11 connected to the primary winding 12a of an input transformer 12 which has a mid-tapped secondary winding 12b. An output transformer 13 has a mid-tapped primary winding 13a, and a secondary winding 13b which is connected to output terminals 14.

The upper end of the secondary winding 12b of the input transformer is connected by a diode 15 to the upper end of the primary winding 13a of the output transformer, and the lower end of the secondary winding 12b is connected by a diode 16 to the lower end of the primary winding 13a of the output transformer. The diodes 15 and 16 are poled to supply current of the same polarity to the opposite ends of the winding 13a. To enable current to flow from the winding 12b through the diodes 15 and 16 and through the winding 13a, the mid taps of the windings 12b and 13a are interconnected by a capacitor 17 which is mounted by a variable conductance element 18, the latter having a conductance varying according to a control potential impressed between two input leads 19 and 20, respectively.

Figure 2:
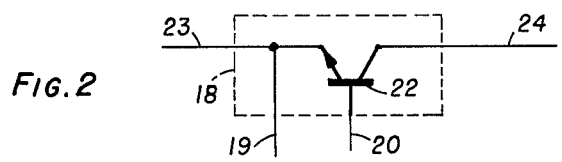
FIG. 2 is a schematic circuit diagram of a representative variable conductance element that may be employed in the circuit of FIG. 1.

As an example of a circuit that may be used for the variable conductance element 18, reference is made to FIG. 2, showing a transistor having its emitter and collector connected respectively to the output leads 23 and 24 and its emitter and base connected respectively to the control leads 19 and 20. As is well known, when a D.C. potential is impressed between the emitter and collector of a transistor, a varying potential applied between the emitter and the base changes the conductance between the emitter and the collector.

The circuit of FIG. 1 operates as follows: Assuming that the conductance of the variable-conductance element 18 is substantially zero, current flows through the diodes 15 and 16 during successive half-cycles to charge the capacitor 17. When this capacitor is charged to the peak potential across each half of the secondary winding 12b, conduction through the rectifiers ceases, no current flows in the primary winding 13a of the output transformer 13, and the potential across the output terminals 14 is zero. However, if the conductance of the element 18 is increased, the capacitor 17 will be discharged at a rate corresponding to the conductivity of element 18, thereby reducing the potential across the capacitor below the peak value generated by the transformer 12, permitting the passage of alternate pulses through the diodes of sufficient amplitude to maintain the charge on capacitor 17 at a fixed value.

The magnitude of the change in the output potential at terminals 14 that is produced by a given change in control potential on the control leads 19 and 20 depends upon the capacitance of the capacitor 17. Thus if the capacitance of the capacitor 17 is small relative to the conductance of the element 18, the potential across the capacitor will vary rapidly in response to a change in the conductance, and vice versa.

Figure 3:
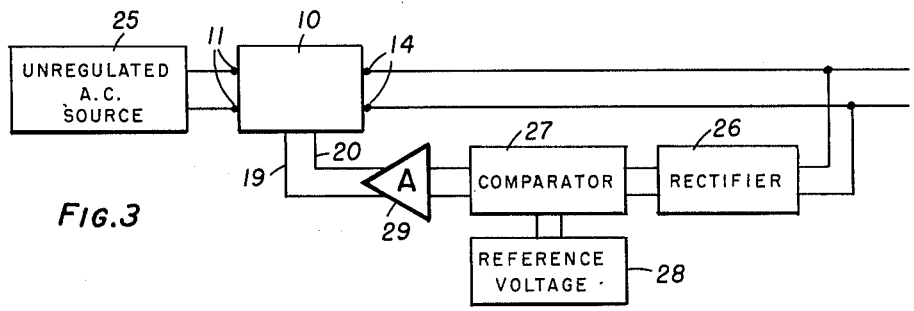
FIG. 3 is a schematic circuit of an A.C. voltage regulator employing the invention.

FIG. 3 shows the use of the device 10 for providing a constant regulated voltage from an unregulated A.C. source 25. A portion of the output from the terminals 14 is rectified in a rectifier 26, and its magnitude compared in a comparator 27 with the magnitude of a reference voltage from a constant source 28. Any variation of the output potential from a predetermined value changes the difference voltage from the comparator 27, which difference is amplified in an amplifier 29 and applied to the control leads 19 and 20 in such direction as to restore the output potential to its desired value.

Figure 4:
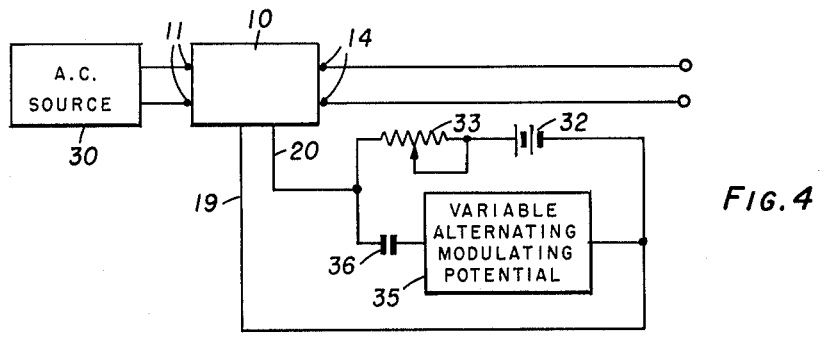
FIG. 4 is a schematic circuit of a modulator employing the invention.

FIG. 4 shows the apparatus 10 used to modulate an alternating current from a source 30. In this application a source 32 of direct current and a variable resistor 33 are connected in series between the control leads 19 and 20, and a source 35 of variable, alternating modulating potential is connected in series with a capacitor 36 across the leads 19 and 20.

The D.C. source 32 and variable resistor 33 provide a constant, but adjustable, biasing potential for clamping the alternating modulating potential at a level such as to provide linear modulation up to 100%.

Although for the purpose of explaining the invention a particular embodiment thereof has been shown and described, obvious modifications will occur to a person skilled in the art, and we do not desire to be limited to the exact details shown and described.

We claim:

Apparatus for varying the potential of an alternating current supplied to a load from a source comprising:

an input transformer for connection to said source for energization thereby, and an output transformer for connection to said load for energizing the load, each transformer having end terminals and a center tap;

one half-wave rectifying means connecting one end terminal of the input transformer to one end terminal of the output transformer and another half-wave rectifying means connecting the other end terminal of the input transformer to the other end terminal of the output transformer, said rectifying elements being each poled in the same direction with respect to the input transformer end terminal to which it is connected;

a capacitor interconnecting the mid taps of said two transformers;

means having an externally controllable variable D.C. conductance connected in shunt to said capacitor; and means for controlling said last mentioned means to vary its D.C. conductance.

References Cited by the Examiner

UNITED STATES PATENTS

| | | | |
|---|---|---|---|
| 2,447,232 | 8/1948 | Cartotto | 321—2 |
| 2,710,938 | 6/1955 | Lee | 321—10 |
| 2,719,258 | 9/1955 | Rich | 321—18 |
| 2,897,379 | 9/1959 | Hinsdale | 307—88.5 |
| 2,909,705 | 10/1959 | Husson | 315—168 |
| 2,932,857 | 2/1960 | Brown et al. | 315—232 |
| 2,933,047 | 4/1960 | Germeshausen et al. | 315—239 |
| 3,026,450 | 3/1962 | Large | 315—171 |
| 3,030,550 | 4/1962 | Smeltzer | 315—238 |
| 3,032,685 | 5/1962 | Loomis | 315—239 |
| 3,049,642 | 8/1962 | Quinn | 315—238 |
| 3,131,327 | 4/1964 | Quinn | 315—223 |

LLOYD McCOLLUM, *Primary Examiner.*